May 31, 1966 R. L. HALEY ETAL 3,253,756
APPARATUS AND METHOD FOR CUTTING GLASS SHEETS
Original Filed April 29, 1963 5 Sheets-Sheet 1
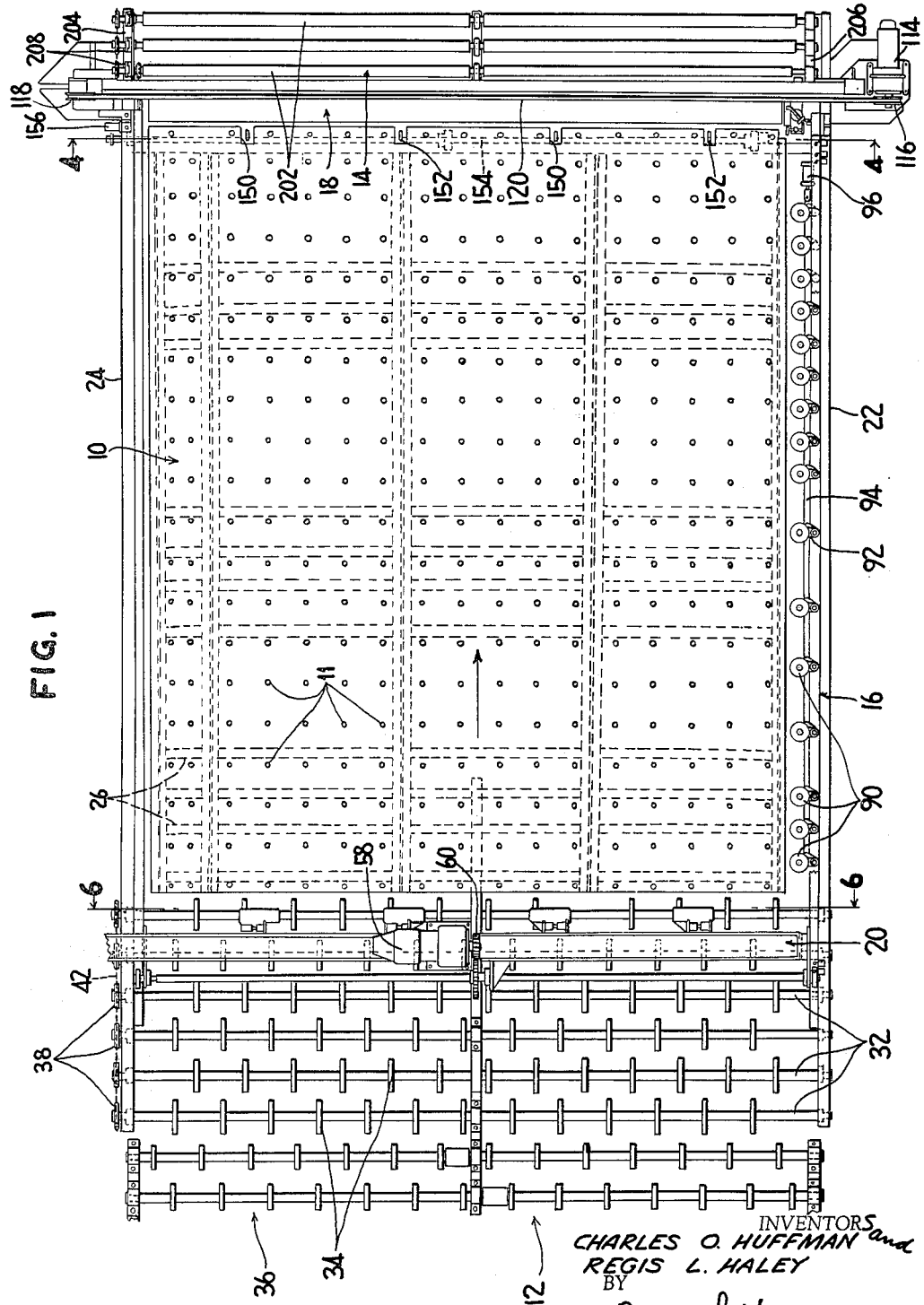
INVENTORS
CHARLES O. HUFFMAN and
REGIS L. HALEY
BY
Oscar L. Spencer
ATTORNEY

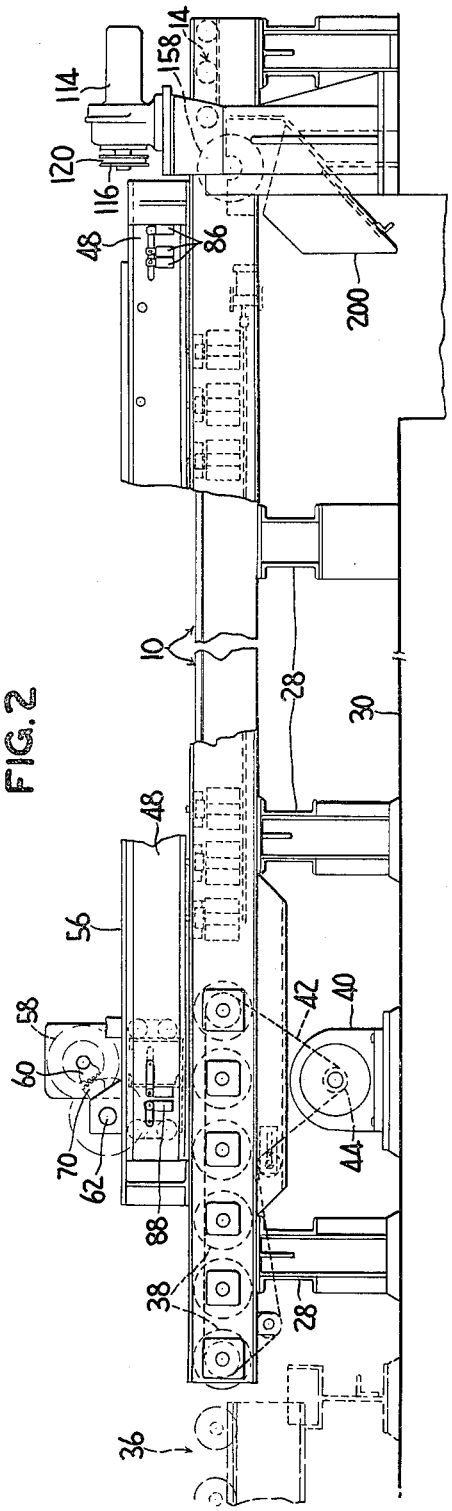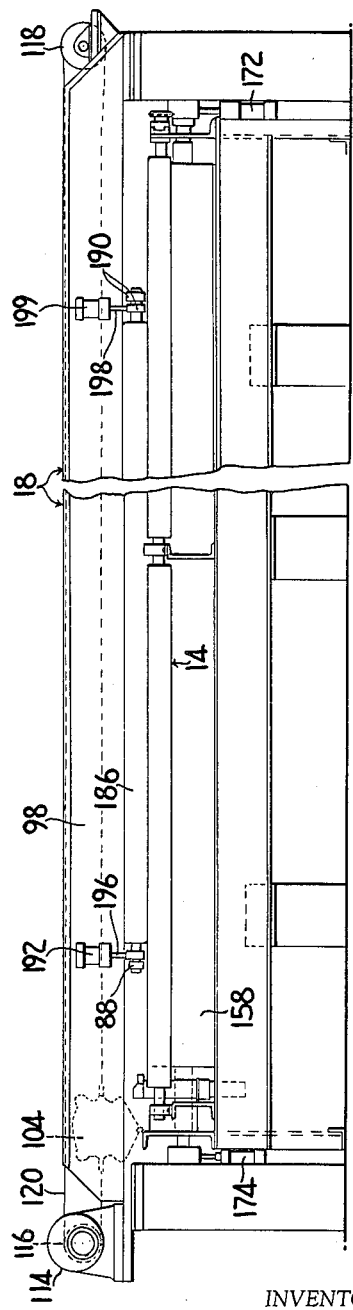

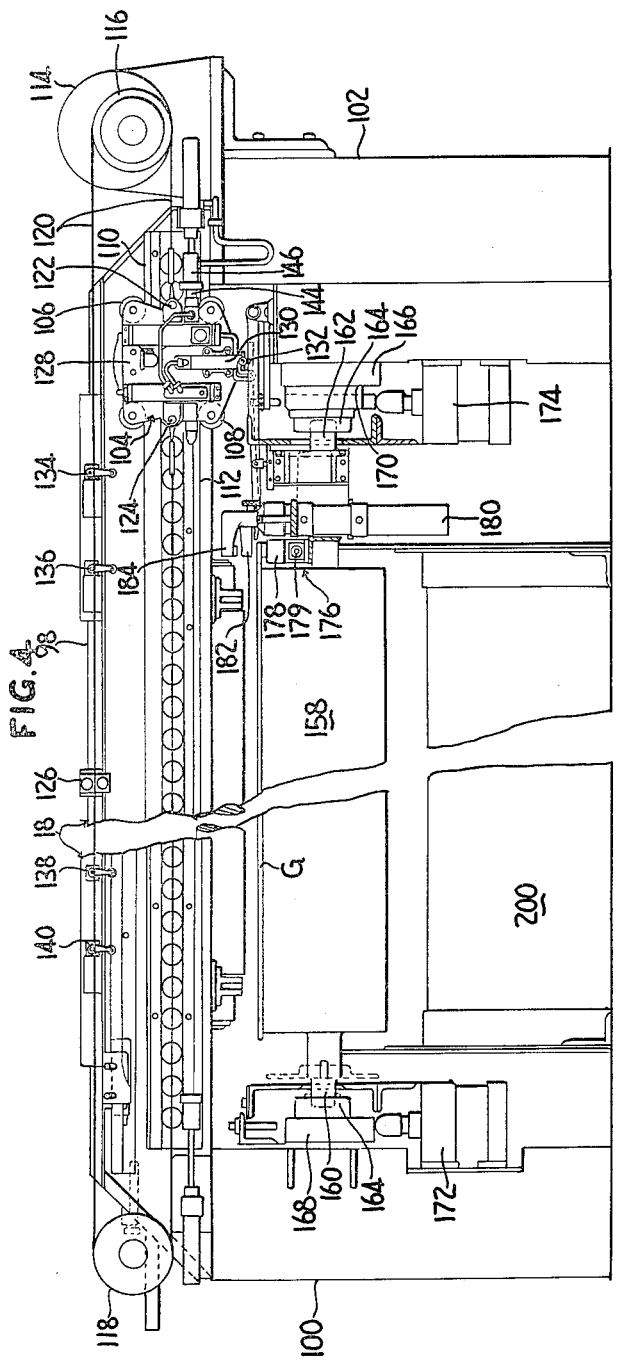

May 31, 1966 R. L. HALEY ETAL 3,253,756
APPARATUS AND METHOD FOR CUTTING GLASS SHEETS
Original Filed April 29, 1963 5 Sheets-Sheet 4
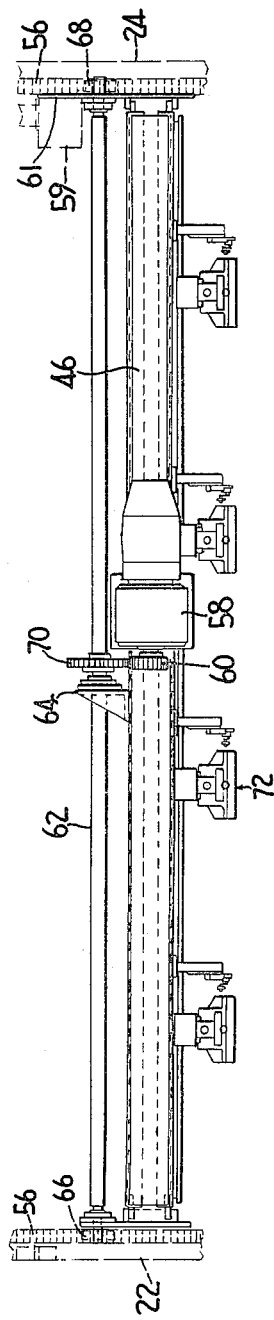
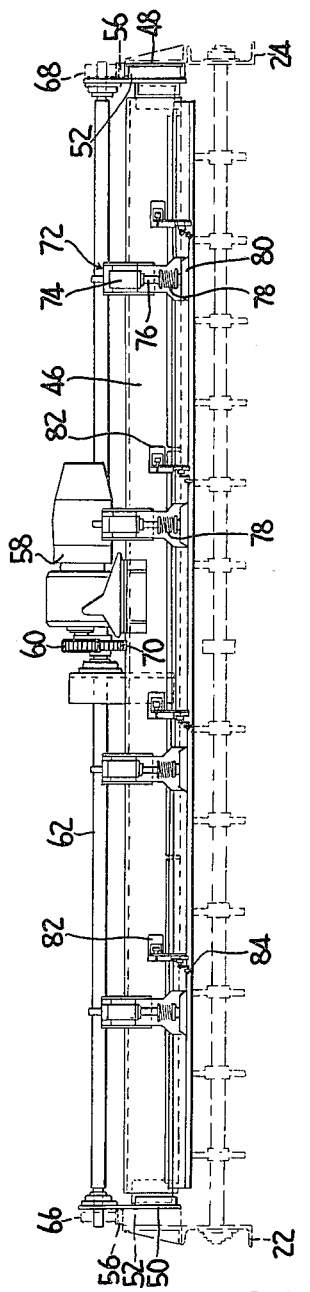
INVENTORS
CHARLES O. HUFFMAN and
REGIS L. HALEY
BY
Oscar L Spencer
ATTORNEY INVENTORS
CHARLES O. HUFFMAN and
REGIS L. HALEY
BY
Oscar L Spencer
ATTORNEY

United States Patent Office 3,253,756
Patented May 31, 1966

3,253,756
APPARATUS AND METHOD FOR CUTTING
GLASS SHEETS
Regis L. Haley, Verona, and Charles O. Huffman, Pittsburgh, Pa., assignors to Pittsburgh Plate Glass Company, Pittsburgh, Pa., a corporation of Pennsylvania
Continuation of application Ser. No. 276,335, Apr. 29, 1963. This application Feb. 16, 1965, Ser. No. 436,418
12 Claims. (Cl. 225—2)

This application is a continuation of application Serial Number 276,335, filed April 29, 1963, now abandoned.

This invention relates to the construction and operation of apparatus for cutting glass sheets and more particularly to the method and apparatus for positioning a glass sheet on a support, aligning an edge of the glass sheet and advancing the glass sheet to a fixed cutter device for cutting the glass sheet into preselected sizes.

To cut glass sheets into preselected sizes, the following procedure is usually followed. The sheet, which may be either a continuous ribbon or elongated individual sheets, is fed to a support device preferably in a horizontal position. An edge of the sheet is squared or aligned with a portion of the support and a multiple scoring and snapping device cuts the sheet into a plurality of preselected sizes. The multiple scoring device includes a support member with a plurality of adjustable scoring tools movably positioned thereon. The scoring tools are adjusted manually for the preselected sizes of the segments cut from the sheet and are locked in the adjusted position. This type of cutting operation is suitable for "cord wood cutting" where all the sheets are cut into the same preselected sizes. To change the size of the segments cut from the glass sheet the scoring tools must be manually adjusted and repositioned for each change. This procedure is time consuming and does not readily adapt itself to preselected programming.

Another difficulty encountered with glass cutting apparatus utilizing a plurality of scoring tools is the accuracy of the scoring. The cutting tools are positioned on a bridge of considerable span and, where the bridge moves relative to the support, deflection of the bridge or support causes inaccuracies in the scoring of the glass sheets and the segments cut therefrom.

The cutting apparatus of the prior art, because of the many manipulative steps required for cutting different sized segments, has been a substantial limiting factor in the over-all production of different sized glass sheets. In the positioning of the glass sheets on the support device, difficulty has been encountered in moving the glass sheet longitudinally into position for the scoring operation and to subsequently convey the scored sheet from the support. Resilient driven rolls are utilized to convey the glass sheet on the support and transverse rolls are used to move the sheet transversely into operative position for the indexing or squaring operation. The rolls are usually made from a soft resilient material and it has been found that upon either rapidly increasing or decreasing the speed of the conveying rolls, markings occur on the under side of the glass sheet. The markings can sometimes be removed by a cleaning process, but this entails additional time and labor. There is a need for apparatus that will accurately and rapidly position, square, score and break a glass sheet into a plurality of different preselected sizes.

Briefly, the invention herein disclosed includes a glass cutting table having a plurality of ports in its top surface. Air is supplied to the ports at a sufficient pressure to provide an air film between the table top surface and the glass sheet. The table is slightly inclined so that the glass sheet moves transversely by gravity on the air film into abutting relation with a squaring device. A fixed cutter bridge spans the table adjacent one end and includes a scoring device that moves transversely across the table. A movable positioning bridge transversely spans the table and moves toward and away from the fixed cutter bridge. The positioning bridge includes suitable means to grip the glass sheet and advance the same in preselected increments toward the cutter bridge while the glass sheet is supported on the air film. Control means and programming means are provided to control the supply of air to the table top surface; sequentially advance the positioning bridge with the glass sheet affixed thereto, toward the fixed cutter bridge; and actuate the scoring device for transverse movement across the glass sheet.

With the invention herein disclosed, an improved method and apparatus is provided for accurately cutting glass sheets into different preselected sizes. The air film on the table provides an improved means for supporting the glass sheet and moving the sheet into a squared or indexed position. The movable positioning bridge moves the glass sheet on the air film beneath the fixed cutter bridge and into scoring position. The positioning bridge advances the sheet for each cut until the desired number of transverse scores and snaps are made in the sheet. The incremental advance of the positioning bridge determines the size of the segment cut from the large sheet. The positioning bridge has a propelling means which is controlled by a programming means so that the bridge is accurately and automatically advanced a preselected distance. The operator supplies the programming means with the selected sizes into which a large glass sheet is to be cut and the programming means then controls and periodically advances the positioning bridge and glass sheet. With this arrangement the apparatus provides greater flexibility in the sizes of the cut segments since each cut is independently programmed. The cutting apparatus further provides greater accuracy because the fixed components are rigidly fastened to the foundation and the movable positioning bridge is propelled on a rigid rack structure. The scoring and snapping occurs at the same relative position on the cutting apparatus to further contribute to a more accurate cutting and separation of the glass sheet into different sized segments.

In describing the preferred embodiment of this invention, illustrated in the drawings, specific terminology will be resorted to for the sake of clarity. It is not intended to be limited to the specific terms so selected and it is to be understood that each specific term includes all technical equivalents which operate in a similar manner to accomplish a similar purpose.

In the drawings:

FIGURE 1 is a top plan view of the improved apparatus for cutting glass sheets.

FIGURE 2 is a view in side elevation with an intermediate section of the glass cutting table removed.

FIGURE 3 is an end elevation of the discharge end of the cutting apparatus illustrated in FIGURE 1 showing the fixed cutter bridge, the pinch roll, the cutting roll, and the run out roll.

FIGURE 4 is a view in elevation taken along the line 4—4 of FIGURE 1 showing the scoring device and the fixed cutter bridge.

FIGURE 5 is an enlarged top plan view of the positioning bridge illustrated in FIGURE 1.

FIGURE 6 is an enlarged view in elevation of the positioning bridge taken along the line 6—6 of FIGURE 1.

Figure 8:
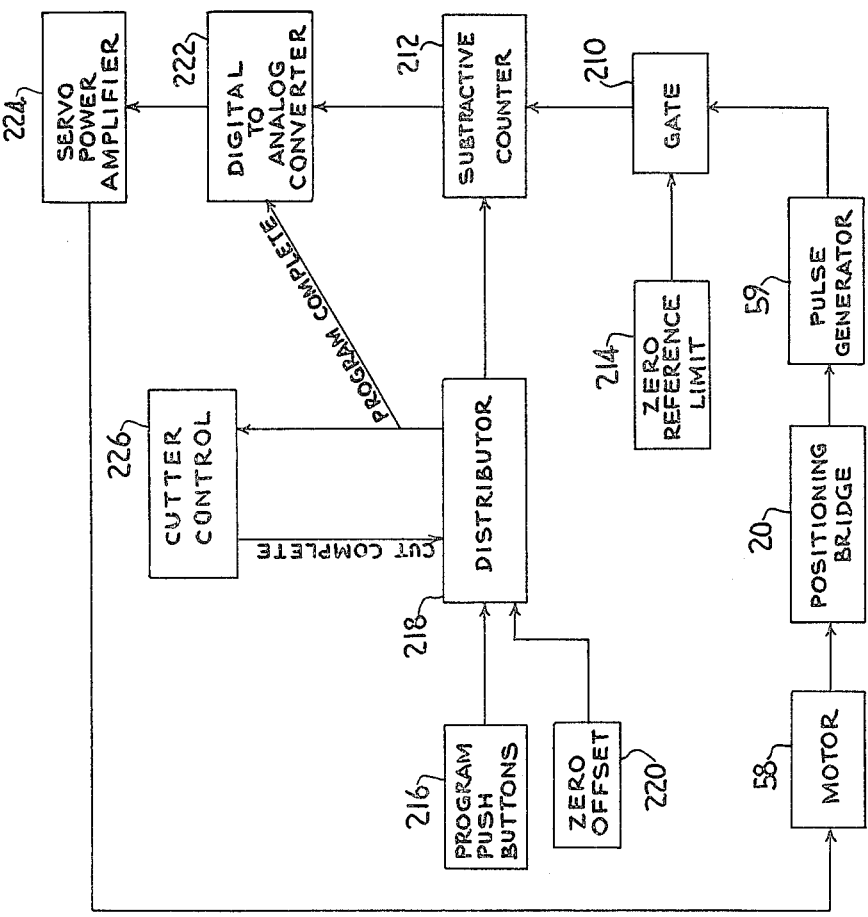
FIGURE 8 is a block diagram illustrating the programming means which controls the positioning of the glass sheet beneath the scoring device for cutting the glass sheet into segments of preselected programmed sizes.

Referring first to the general arrangement as illustrated in FIGURES 1 and 2, the glass cutting apparatus includes an air table 10 arranged in a substantially horizontal position. Adjacent one end of the table 10 there is a run in sction 12 over which glass sheets are fed to the air table 10. Adjacent the other end of the air table 10 there is a run out section generally designated by the numeral 14 that receives the cut segments of the glass sheet. The direction of glass movement across table 10 is, therefore, from run in section 12 toward run out section 14, as is indicated by the arrow in FIGURE 1.

The glass cutting apparatus has a squaring device generally designated 16 adjacent a side edge portion of table 10. As will be later described, the glass sheet moves transversely on the air table 10 adjacent to the squaring device 16 which traverses in an arc contacting the edge of the glass sheet thereby affecting square of the glass sheet. A fixed cutter bridge generally designed 18 is positioned transversely of the direction of glass movement between an edge of the air table 10 and the run out section 14. The fixed cutter bridge includes a glass scoring means that travels transversely across the table and scores the glass sheet therebeneath. A positioning bridge generally designated by the numeral 20 spans the air table 10 and is arranged to move toward and away from the cutter bridge 18. The positioning bridge 20 as it moves toward the cutter bridge 18 advances the glass sheet beneath the cutter bridge 18 for scoring and breaking into preselected dimensions.

Referring in greater detail to the specific components, the glass cutting apparatus includes a pair of longitudinal beams 22 and 24 and transverse members 26 that form a frame-like structure. Vertical supports 28 maintain the frame-like structure above the floor 30.

The air table 10 is supported by the transverse members 26 in a substantially horizontal position between the longitudinal beams or channels 22 and 24. The air table 10 is formed of any suitable material that will support a sheet of glass and provide sufficient frictional resistance to movement of glass thereon in the absence of an air film between the under surface of the glass sheet and the top surface of the table. It has been found that a table top surface fabricated from fiber glass provides the necessary frictional resistance without marking the under surface of the glass sheet. The air table 10 is provided with a plurality of ports or openings 11 in its top surface.

Figure 7:
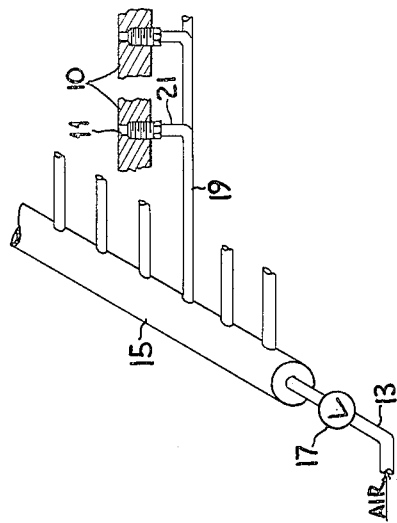
FIGURE 7 is a fragmentary schematic illustration of the air ports in the table and the conduits supplying air thereto.

FIGURE 7 illustrates schematically the arrangement whereby the air ports 11 are supplied with air under pressure. A conduit 13 supplies air under pressure from a suitable source to a common header 15 extending along a side of table 10. A valve 17 is positioned in conduit 13 and controls the flow of air to header 15 and to ports 11. The header 15 has a plurality of conduits 19 extending laterally therefrom. The ports 11 are connected to the conduits 19 by connecting conduits 21 so that air is supplied to a plurality of transversely aligned ports 11 from a common conduit 19.

When the control valve 17 is open air is supplied to the ports 11 through the header 15 and conduits 19 and 21 at a sufficient pressure to lift the glass sheet a predetermined distance above the table top surface so that the sheet of glass floats on a film of air and little energy is required to move the glass sheet on the table. When the control valve 17 supplying air to the ports 11 is closed the glass sheet rests on the table top surface and is not readily movable thereon.

The air table top surface is slightly inclined in a transverse direction toward the beam or channel 22 so that the glass sheet has a tendency to move by gravity on the air film toward the channel 22 and squaring device 16, as later explained.

The run in section 12 located adjacent a transverse edge of the air table 10 includes a plurality of rotatable shafts 32 arranged in parallel spaced relation to each other and rotatably supported by beams 22 and 24. The shafts 32 have spaced resilient annular rolls 34 positioned thereon and rotatable therewith. The rolls 34 are arranged to support a glass sheet fed thereto from a feeding section generally designated by the numeral 36 and partially illustrated in dotted lines in FIGURES 1 and 2. The glass sheet is conveyed along the feeding section 36 by suitable propelling means (not shown) to the run in section 12.

As illustrated in FIGURE 1, sprockets 38 are secured to one end of the shafts 32 and are arranged to rotate the shafts 32 and rolls 34 at preselected speeds. A motor 40 (FIGURE 2) is positioned beneath the run in section 12 and is arranged to drive the sprockets 38 by means of an endless chain 42 and drive sprocket 44. A suitable sensing device is provided on the run in section 12 for controlling the motor 40 and the air supply to table 10. As the leading edge of a sheet of glass passes over the sensing device, the valves controlling the air to ports 11 on air table 10 are opened to provide a film of air for the glass sheet as it moves onto the air table 10. The same sensing device senses the trailing edge of the sheet and decreases the speed of motor 40 so that the forward movement of the glass sheet is reduced. For example, the glass sheet as it enters the run in section 12 is traveling at approximately 30 inches per second. After the training edge of the glass sheet has actuated the sensing device, the speed of the rolls 34 is reduced and the movement of the glass sheet is reduced from 30 inches per second to approximately 15 inches per second. The glass sheet as it moves onto table 10 is supported by the film of air between the under side of the glass sheet and the top surface of air table 10. The advance of the glass sheet on the air table 10 can be stopped by closing the air control valves supplying air to the ports 11.

The positioning bridge 20 is illustrated in detail in FIGURES 5 and 6 and includes an elongated truss 46 that is positioned transversely of the table 10. The beams 22 and 24 have elongated support side plates 48 and 50 positioned thereon and arranged to support the truss 46 for longitudinal movement relative thereto. The support side plates 48 and 50 each have inwardly extending portions 52 that support truss member 46. Secured to the upper portion of support members 48 are rack members 56. The truss 46 is movable longitudinally on the spaced supports 48. Mounted on the truss member 46 there is a gear motor 58 which drives a spur gear 60 in both directions. A shaft 62 is secured to the truss 46 by a suitable support 64 in parallel spaced relation thereto. The shaft 62 is arranged to rotate in support 64 and has a pair of pinions 66 and 68 which mesh with the members 56 positioned on support 48. The shaft 62 has a spur gear 70 positioned thereon in meshing relation with spur gear 60 secured to motor 58. The positioning bridge 20 is thus propelled toward and away from the cutter bridge 18 by the motor 58 driving spur gears 60 and 70 to rotate shaft 62 and pinions 68 and 70 in racks 56. The motor 58 is controlled by numerical positioning equipment which includes a pulse generator 59 supported by a plate 61 extending rearwardly from the truss 46. The pulse generator 59 is movable with the positioning bridge 20.

The truss 46 has a plurality of glass gripping devices generally designated by the numeral 72 secured thereto which are similar in construction and include an air cylinder 74 with a piston having a rod 76 extending out of the cylinder 74. The rod 76 is connected to a spring 78 which in turn is connected to a vacuum cup 80. Suitable means are provided to extend the rod 76 from cylinder 74 to move the vacuum cup 80 into abutting relation with the glass sheet and to apply vacuum to the cups 80 to grip the top surface of the glass sheet. Also secured to the front portion of truss 46 are a plurality of limit switches 82 which have roller members 84 so positioned that they ride on the top surface of the glass sheet.

The elongated bridge support 48 has a plurality of limit switches 86 and 88 (FIGURE 2) adjacent the run in section 12 and run out section 14. The limit switches 88 are actuated by a portion of the positioning bridge 20 to provide a signal for the motor 58 to stop in its rearmost position.

The squaring device generally designated by the numeral 16 is supported by the longitudinal beam 22 and includes a plurality of vertically extending rollers 90 which are secured to a link mechanism 92. All of the link mechanisms 92 are connected to a common actuating shaft 94 which has one end connected to an air actuator 96. The air actuator 96 moves the shaft 94 longitudinally to pivot the linkage 92 and move the vertical rollers outwardly into abutting relation with an edge of the glass sheet.

The air table 10 is inclined transversely so that the lower edge adjacent the squaring device 16 is approximately three inches below the opposite edge. The glass sheet on table 10 when supported by an air film moves transversely by gravity toward the squaring device 16. Control means are provided to actuate the air cylinder 96 and move the vertical rollers 90 transversely to square a longitudinally extending edge of the glass sheet along a preselected index line. After the sheet has been squared or indexed the air supply to the table is shut off and the table top surface frictionally holds the glass sheet in the squared or indexed position.

The positioning bridge 20 advances and moves toward the cutter bridge 18 until the limit switches 81 sense the rear edge of the glass sheet. The limit switches deenergize the motor 58 and actuate the cylinders 74 to lower the vacuum cups 80 into engaging relation with the top surface of the glass sheet. A vacuum is established so that the glass sheet is firmly held by the vacuum cups 80 and the glass sheet can be moved on an air film by the positioning bridge 20.

The cutter bridge generally designated by the numeral 18 is illustrated in detail in FIGURES 3 and 4, and includes a truss 98 transversely spanning the table 10 and supported by vertical supports 100 and 102. A scoring device generally designated by the numeral 104 is arranged to move longitudinally on the truss 98 by means of rollers 106 and 108 supported in parallel tracks 110 and 112 on truss 98. A motor 114 is supported by the vertical support 102 and has pulley 116 secured thereto for rotation therewith. Another pulley 118 is suitably supported on the truss 98 adjacent the vertical support 100. A steel tape 120 is secured at one end to the scoring device 104 at 122 and the other end is secured to the opposite side of scoring device 104 at 124. The tape 120 extends around pulleys 116 and 118 and has its upper reach supported by guides 126. With this arrangement rotation of pulley 116 by motor 114 moves the scoring device 104 transversely across the table 10.

The scoring device 104 has a body portion 128 with an air cylinder 130 secured thereto. A scoring tool 132 is secured to the cylinder 130 and is movable vertically relative thereto. The movement of the scoring tool 132 is actuated by air in cylinder 130. Suitable air supply means are provided for cylinder 130 through receiver 144 that moves into abutting relation with air supply device 146. Limit switches 134, 136, 138 and 140 are positioned on the cutter bridge 18 and are actuated by scoring device 104. With this arrangement, the scoring device 104 is controlled by motor 114 and the motor is controlled by limit switches 134, 136, 138 and 140.

An air table 10 has a plurality of longitudinal recessed portions 150 and sensing devices 152 extend upwardly therethrough. The sensing devices 152 are connected to a common shaft 154. The shaft 154 is rotatably supported in longitudinal beams 22 and 24 and is arranged upon rotation to actuate a limit switch 156. With this arrangement, the leading edge of the glass sheet strikes the sensing devices 152 to rotate the shaft 154 and open limit switch 156 to provide an index line for the numerical positioning equipment.

Beneath the scoring device 18 there is a cutting roll 158 suitably supported by vertical supports 100 and 102. The cutting roll 158 has shaft end portions 160 and 162 supported in bearings 164 and 166. The bearings are slidably mounted in vertical mounting devices 168 and 170 for vertical movement therein. Cylinders 172 and 174 are arranged to move the cutting roll upwardly to break the glass sheet after it has been scored. A snapper device generally designated by the numeral 176 is positioned adjacent the cutter roll 158 and has a cut running anvil 178 positioned to abut the bottom surface of the glass sheet adjacent one edge. The snapper device 176 includes an air cylinder 180 having vertically movable pairs of fingers 182 and 184 which are actuatable to move downwardly and grip the top surface of the sheet. The inner fingers 182 are used for trim cuts. The outer fingers 184 are used for intermediate cuts.

After the score is made, the cutting roll 158 lifts the glass approximately one-eighth inch. At this time the lower anvil 178 is moved upwardly directly under the score, lifting the sheet one-eighth inch above the cutting roll 158. With the sheet lifted above the cutting roll 158, the upper outer fingers 184 are lowered, causing the sheet to snap.

Secured to the truss 98 (FIGURE 3), there is a pinch roll 186 supported at its ends by bearing supports 188 and 190. The supports 188 and 190 are connected to air cylinders 192 and 194 by shafts 196 and 198. The air cylinders are arranged to move the pinch roll 186 in a vertical direction. To snap trailing trims, the pinch roll 186 moves in a vertical direction securely holding the glass while the score is made. At the end of the travel of scoring tool 132 the pinch roll 186 is retracted, the bottom anvil 178 moves upwardly directly under the score at the precise moment the inner fingers 182 come down contacting the surface of the glass thereby snapping or running the score. Beneath the cutting roll 158 there is a cullet chute 200 arranged to receive the narrow trim edges cut from the sheet of glass.

The run out section 14 has a plurality of parallel rolls 202 suitably supported in side channels 204 and 206 for rotation therein. The rolls 202 are covered with a resilient material such as rubber or the like and are arranged to support the cut sections of the glass sheets as they are conveyed away from the cutting bridge 18. Suitable clutch devices 208 are associated with the rolls 202 to permit the rolls to rotate freely as the uncut sheet moves thereacross and to engage and convey the cut segments from the glass cutting apparatus as soon as the segments are broken.

FIGURE 8 is a schematic block diagram of the programming means for positioning the glass sheet beneath the cutter bridge for scoring and breaking the glass sheet into preselected programmed sizes. The positioning bridge 20, pulse generator 59 and bridge driving motor 58 are illustrated as being interconnected. As previously discussed, the bridge 20 includes a drive motor 58 and a pulse generator 59. The positioning bridge 20 conveys the glass sheet toward the cutter bridge 18.

The bridge positioning motor 58 propels the bridge 20 along the rack mechanism, as previously described. The pulse generator 59 is a bidirectional unit such as a Rotrac feedback pulse generator manufactured by Westinghouse Electric Corporation. The pulse generator 59 is driven by a precision rack attached to the support table and is so geared to provide one hundred thirty-two pulses per revolution, which is equivalent to thirty-two pulses per inch.

The electrical output from pulse generator 59 is fed to a gating circuit indicated by the numeral 210 and generally indicated as a gate. The gating circuit either lets pulses through to a subtractive counter 212 or blocks the pulses within the gate 210. The apparatus is so arranged that the pulses are blocked from the subtractive counter 212 by gating circuit 210 until the leading edge of the glass sheet strikes the zero reference limit. The zero reference limit 214 is connected to the sensing devices 152 illustrated in FIGURE 1 adjacent the cutter bridge 18. When the front edge of the glass sheet actuates the sensing device 152 the zero reference limit 214 opens gating circuit 210 so that the pulses enter the subtractive counter 212. The gating circuit remains open until the program is completed and the sheet of glass is cut into the preselected segment.

Referring to the programming means, there is a push button keyboard or programming console indicated in FIGURE 8 by the numeral 216. The operator inserts on the programming console the dimensions of the segments which are desired to be cut from the oncoming sheet of glass. The console preferably includes rows of buttons that will select the sizes of the segments of glass. The information from push button keyboard 216 is fed to a central distributor 218 and from the distributor 218 to the subtractive counter 212. The distributor 218 supplies the desired program at the desired time so that when the first cut, for example, is complete, the distributor then steps to the next position, reporting the next size fed thereto from the keyboard 216 and the information for the second cut is fed from the distributor 218 to the subtractive counter 212.

There is required on all sheets of glass a front edge or an initial trim cut. The edge trim dimension is also programmed into the console 216. As the bridge 20 advances, the zero offset distance indicated by block 220 is fed through distributor 218 into subtractive counter 212. The zero offset distance is fed into the subtractive counter 212 to compensate for the distance between the exact cutting line and the position of the zero reference limit actuated by the limit switches or sensing devices 152.

The pulses from pulse generator 59 are subtracted from the initial program fed into the subtractive counter 212 by the distributor 218 until a so-called zero null is reached. The subtractive counter 212 continually feeds a signal representing the difference between the actual program inserted in console 216 and the length of the sheet beyond the cutting line to a digital to analog converter indicated by the block 222. The converter converts the digital information to analog information. The general function of the digital to analog converter is to provide a signal to a servo power amplifier indicated by the block 224 which is representative of the distance remaining for the bridge to travel before the programmed distance is reached. This signal controls the forward speed of the positioning bridge 20 via the servo power amplifier 224 and bridge motor 58. With this arrangement the digital to analog converter corrects over-travel by the bridge 20 to produce a reverse signal to the servo power amplifier and drive the positioning bridge 20 in the reverse until the null position is reached. When the null position is reached, the digital to analog converter output is zero and the bridge motor 58 stops. When the digital to analog computer output is at zero or has reached the null position, a relay (not shown) is energized which initiates the cutting cycle. The control for the cutter cycle is indicated by the block 226. The distributor 218 further supplies information to the digital to analog converter and the cutter control 226 when the program supplied thereto from the console 216 is complete. The cutter control 226 provides a signal for the distributor 218 when each cut is complete so that the distributor 218 through subtractive counter 212 advances the bridge 20 to the next program cut. This cycle continues until all the programmed cuts are complete. A program complete signal is then fed to the digital to analog converter which causes the next sheet of glass to be run onto the cutting machine and causes the bridge to return to its rearmost home position.

The programming means preferably includes a "Prodao" numerical program single coordinate point to point digital positioning system as manufactured by Westinghouse Electric Corporation. It will be appreciated by those skilled in the art that other suitable programming means may be employed to sequentially position a sheet of glass beneath a fixed cutter bridge to cut the glass sheet into segments of preselected size.

*Operation*

The cutting apparatus herein illustrated will be described in conjunction with the programming means above described. The cutting apparatus operates as follows. A sheet of glass is conveyed to the run in section 12 from the feeding section 36 at a preselected speed of about thirty inches per second. Suitable sensing means are provided in the run in section 12 to sense the presence of the glass sheet thereon. The sensing device senses the leading edge of the glass sheet and opens air valve 17 (FIGURE 7) to supply air to ports 11 in the top surface of air table 10. The trailing edge of the glass sheet actuates a sensing device to reduce the speed of motor 40 and shafts 32 in run in section 12. This reduces the speed at which the glass sheet advances on the air table 10 so that the sheet as it moves on the table 10 is traveling at approximately fifteen inches per second. A suitable sensing device senses the rear edge of the glass sheet as it leaves the last roll on run in section 12 and closes air valve 17.

After a time delay sufficient to stop the glass by frictionally engaging the table, air is then again supplied to the table 10 by opening valve 17. The slight inclination of air table 10 causes the glass sheet to move transversely against the vertical rollers 90 of squaring device 16. The rollers 90 are then moved outwardly by air cylinder 96 to square the glass sheet along a preselected index line. After the sheet is properly squared, the air valve 17 is again closed and the glass sheet is frictionally engaged in a squared position by the table upper surface.

The positioning bridge 20 is then actuated to move toward the rear edge of the glass sheet. The rollers 84 actuate limit switches 82 to stop the forward movement of positioning bridge 20 and actuate the glass-gripping devices 72 to move the vacuum cups 80 into abutting relation with the top surface of the glass sheet. A vacuum is then applied to the vacuum cups 80 to secure the glass sheet to the positioning bridge 20.

The positioning bridge 20 is now positioned to feed the glass sheet beneath the cutter bridge 18. Air valve 17 is again opened to supply air to air table 10 and provide a film of air between the table top surface and the under side of the glass sheet. The motor 58 is actuated to move the positioning bridge 20 and the glass sheet toward the cutter bridge 18. As the positioning bridge 20 is advancing toward the cutter bridge 18, the pulse generator 59 is transmitting pulsed signals. The gating circuit 210 blocks the signal from the subtractive counter 212 until the front edge of the glass sheet actuates sensing means 152 to open limit switch 156. The sensing means 152 actuates the zero reference limit 214 to open the gating circuit 210 to permit the signals from the pulse generator 59 to be fed into the subtractive counter 212.

An operator has inserted on the push button programming console 216 the dimension of the front edge trim and the preselected sizes of the segments to be cut from the glass sheet. The subtractive counter 212 subtracts the dimension of the front edge trim and the zero offset 220 and stops the advance of positioning bridge 20 when the preselected edge trim is beneath the cutter bridge 18. Thus the zero offset distance is ged into the subtractive counter to compensate for the distance between the exact cutting line and the position of the zero reference limit switch.

Suitable controls are provided to stop the flow of air to the table. The cutter control 226 then actuates the motor 114 to move the scoring device 104 transversely across the sheet. After the score is made, the bottom anvil 178 moves upward directly under the score and at substantially the same time the inner fingers 182 move downwardly contacting the top surface of the glass sheet thereby snapping or running the score. The edge trim is discharged into the cullet chute 200.

The cutter control 226 then provides a signal to the distributor 218 that the cut is complete. The air valve 17 is opened to provide a film of air between the air table 10 and the glass sheet. The glass sheet is then advanced a preselected distance as determined by the program inserted in the push button console 216. The subtractive counter 212, digital to analog converter 222 and servo amplifier 224 control motor 58 on positioning bridge 20 so that the glass sheet stops beneath the cutter bridge at a preselected dimension of the glass sheet. After the glass sheet has stopped, the air supply to the table 10 is stopped and the cutter control 226 again actuates the motor 114 to move the scoring device 104 transversely across the glass sheet. After the score is made the cutting roll 158 lifts the glass sheet approximately one-eighth inch. At this time the lower anvil 178 is moved upward directly under the score, lifting the glass sheet one-eighth inch off the cutting roll 158. At substantially the same time the upper outer fingers 184 are lowered, causing the sheet to snap. The cut segment of the glass is conveyed away from the glass cutting apparatus by the rolls 202 in run out section 14.

Air is again provided between the table 10 and the glass sheet and the positioning bridge 20 again advances the glass sheet on the air film according to the programmed dimension of the next segment to be cut from the glass sheet. The glass sheet is again scored by the scoring device and snapped as previously described. The same operation is repeated until all the segments of programmed dimension are cut from the glass sheet. The trailing trim is snapped by moving the pinch roll 186 in a vertical direction to securely hold the glass sheet while the score is made. At the end of the travel of the scoring device 104, the pinch roll 186 is retracted and the bottom anvil 178 moves upwardly directly under the score at substantially the same time that the inner fingers 182 move downwardly contacting the top surface of the glass sheet, thereby running the score. The trailing trim is discharged between the cutting roll 158 and the first run out roll 202 into the cullet chute 200.

The digital to analog converter 222 through servo power amplifier 224 has actuated motor 58 to move the bridge to its rearward position. The positioning bridge 20 continues to move toward the run in section 12 until limit switches 88 in supports 48 are actuated. At this point, the positioning bridge stops at its rearmost position adjacent the run in section 12.

It will be readily apparent from the foregoing description of the improved method and apparatus that it is now possible to accurately cut a glass sheet into preselected sizes. The inclined air table provides both a frictionless support for the glass sheet as it is conveyed by the movable positioning bridge and a means to square the sheet on the table. The fixed cutter bridge and the movable positioning bridge permit accurate scoring and breaking of the glass sheet into preselected sizes.

According to the provisions of the patent statutes, the principle, preferred construction, and mode of operation of the invention have been explained, and what is now considered to represent its best embodiment has been illustrated and described. However, it should be understood that, within the scope of the appended claims, the invention may be practiced otherwise than as specifically illustrated and described.

We claim:

1. In a conveying and squaring device for a glass sheet the combination comprising
    a table to support a glass sheet,
    said table having a substantially horizontal top surface with a slight transverse inclination to provide a lower longitudinal side portion,
    said table having a transversely movable abutment means positioned adjacent said lower lonigtudinal side portion,
    said table top surface having a plurality of openings therein,
    means to supply air through said openings to provide a film of air between said table top surface and said glass sheet positioned thereon so that said glass sheet is supported by said film of air,
    said table top surface being so constructed that said glass sheet remains immovably fixed thereto in the absence of said film of air,
    said glass sheet arranged to move transversely by gravity on said film of air so that an edge of said glass sheet moves into abutting relation with said abutment means,
    said abutment means arranged to move transversely away from said table lower longitudinal side portion a preselected distance to thereby square said glass sheet on said table,
    valve means to stop the supply of air to said table top surface openings so that said glass sheet bottom surface is frictionally engaged by said table top surface in said squared position,
    a pair of parallel rails arranged on opposite longitudinal sides of said table,
    a positioning device transversely spanning said table and supported by said rails for movement relative to said table,
    a plurality of vacuum cups carried by said positioning device and movable vertically toward and away from the top surface of said glass sheet,
    propelling means for said positioning device, and
    sensing means carried by said positioning device and arranged to sense the trailing edge of said glass sheet on said table and deenergize said propelling means,
    means to move said vacuum cups downwardly into engagement with said squared glass sheet top surface adjacent said trailing edge,
    said positioning device arranged to convey said squared glass sheet longitudinally on said table while said glass sheet is supported on said film of air.

2. In glass cutting apparatus the combination comprising
    a table to support a glass sheet,
    said table having a substantially horizontal top surface with a slight transverse inclination to provide a lower longitudinal side portion,
    said table having a transversely movable abutment means positioned adjacent said lower longitudinal side portion,
    said table top having a plurality of openings therein,
    means to supply air through said openings to provide a film of air between said table top surface and a glass sheet positioned thereon so that said sheet is supported by said film of air,
    a fixed cutter bridge arranged transversely of said table adjacent one end,
    said fixed cutter bridge operable to span a glass sheet positioned thereunder and including a scoring device to score said glass sheet,
    means for feeding a glass sheet to the other end of said table while air is supplied to said table top surface through said openings,
    said glass sheet arranged to move transversely by gravity on said film of air so that a longitudinal edge of said glass sheet moves into abutting relation with said abutment means,
    said abutment means arranged to move transversely a preselected distance to thereby square said glass sheet on said table top surface,
    a positioning bridge spanning said table and arranged to move toward and away from said fixed cutter bridge, said cutter bridge engageable with a portion of said squared glass sheet and arranged to advance said glasss sheet on said film of air to a position beneath said fixed cutter bridge, said scoring device arranged to move longitudinally on said fixed cutter bridge to score said glass sheet, and means to break said glass sheet along said score.

3. In glass cutting apparatus the combination comprising a table to support a glass sheet in a substantially horizontal position, a run in section positioned adjacent one end of said table in substantially the same horizontal plane and arranged to convey glass sheets onto said table top surface, a run out section positioned adjacent the other end of said table in substantially the same horizontal plane and arranged to convey cut segments of said glass sheet away from said table, said table top surface having a plurality of openings therein, means to supply air through said openings to provide a film of air between said table top surface and a glass sheet positioned thereon so that said sheet is supported by said film of air, a fixed cutter bridge arranged transversely of said table between said table and said run out section, a cutting roll positioned beneath said fixed cutter bridge between said table and said run out section, said fixed cutter bridge operable to span a glass sheet positioned thereunder and including a scoring device to score said glass sheet, said run in section including conveying means to transfer glass sheets therefrom to said table while air is supplied to said table top surface through said openings, means to square an edge of said glass sheet on said table top surface, a positioning bridge spanning said table and arranged to move toward and away from said fixed cutter bridge, said positioning bridge engageable with a portion of said glass sheet and arranged to advance said glass sheet on said film of air to a position beneath said fixed cutter bridge, said scoring device arranged to move longitudinally on said fixed cutter bridge to score said glass sheet, means to break said glass sheet along said score, and said run out section including conveying rollers to convey the cut segments of the glass sheet away from said fixed cutter bridge.

4. In glass cutting apparatus as set forth in claim 3 in which said run in section includes a plurality of rollers, means to rotate said rollers at preselected speeds, and sensing means actuatable by the trailing edge of said glass sheet to reduce the speed of said rollers and thereby reduce the speed of the sheet of glass as said sheet is transferred to said air table.

5. In glass cutting apparatus as set forth in claim 3 in which said run out section includes a plurality of driven conveying rollers, means to drive said rollers, clutch means for said rollers arranged to disengage said rollers from said drive means as said uncut glass sheet is transferred thereto by said positioning device, said clutch means engageable after a segment of said glass sheet is scored and broken to actuate said rollers to convey said cut segment away from said fixed cutter bridge.

6. Glass cutting apparatus as set forth in claim 3 in which said table includes sensing means adjacent the fixed cutter bridge, said sensing means being responsive to the front edge of a glass sheet and operable to actuate programming means for sequential cutting of preselected segments of said glass sheet.

7. A method for cutting a glass sheet into segments of preselected size comprising positioning the glass sheet on a support device in a substantially horizontal position, squaring an edge of the glass sheet on said support device, engaging a positioning device to the top surface of said glass sheet adjacent the trailing edge of the glass sheet, advancing the glass sheet and positioning device toward a fixed cutter means, stopping said glass sheet beneath said fixed cutter means, scoring said glass sheet positioned beneath said fixed cutter bridge, breaking said glass sheet along said score, and conveying the cut segment of said glass sheet away from said fixed cutter means.

8. A method for cutting a glass sheet into a plurality of segments of preselected size comprising transferring a glass sheet from a conveying means to a cutting table, providing an air film on said cutting table to support said glass sheet, sliding said glass sheet transversely on said air film against a squaring device to thereby square a longitudinal edge of said table, thereafter removing said air film from said table top surface to frictionally engage said glass sheet to said table top surface in said squared position, engaging a movable positioning device to the top surface of said glass sheet adjacent the glass sheet trailing edge, supplying an air film to said table top surface to again support said glass sheet, advancing said glass sheet by said movable positioning device toward a fixed cutter bridge, sensing the leading edge of said glass sheet at a preselected distance from said fixed cutter bridge, thereafter continuously measuring and recording the distance traveled by said glass sheet toward and beneath said cutter bridge, stopping said glass sheet after a preselected portion of said glass sheet has passed under said fixed cutter bridge, scoring said glass sheet positioned beneath said fixed cutter bridge, breaking said glass sheet along said score, conveying the cut segment of said glass sheet away from said fixed cutter bridge, and thereafter repeating the advancing, stopping, scoring and breaking of the glass sheet until the glass sheet is cut into a plurality of segments of preselected size.

9. In a conveying device for conveying flat glass in a substantially horizontal position the combination comprising a table to support said flat glass in a substantially horizontal position, said table top surface having a plurality of openings therein, means to supply air through said openings to provide a film of air between said table top surface and said flat glass positioned thereon so that said flat glass is supported by said film of air, means, including a positioning device movable relative to said table, to engage a top surface of said flat glass and convey said flat glass on said table while said flat glass is supported on said film of air, a pair of parallel rails arranged on opposite longitudinal sides of said table, said positioning device transversely spanning said table and supported on said rails for movement relative to said table, and a plurality of vacuum cups carried by said positioning device and movable vertically toward and away from the top surface of said flat glass, said vacuum cups arranged to be moved downwardly into engagement with the top surface of said flat glass and provide a connection between said flat glass and said positioning device.

10. In glass cutting apparatus the combination comprising a support device to support a glass sheet in a substantially horizontal position, a fixed means including a scoring device spanning said support device and arranged to score a glass sheet positioned thereunder, means for positioning a glass sheet on said support device in a substantially horizontal position, a positioning device movable relative to said support device and arranged to engage a portion of said glass sheet supported on said support device and move the sheet relative to the support device, means for moving said positioning device and thereby moving said engaged glass sheet toward said fixed means and stopping said positioning device at a preselected position with said glass sheet beneath said fixed means, said scoring device arranged to move longitudinally on said fixed means to score said glass sheet beneath said fixed means, means to break said glass sheet along said score, and a pulse counter carried by said positioning device, said pulse counter measuring the distance traveled by said positioning device to enable said positioning device to position said glass sheet at preselected positions beneath said fixed means to thereby cut said glass sheet into preselected sizes.

11. In a conveying device for conveying flat glass sheets, the combination comprising means for intermittently air supporting a glass sheet; means for positioning said glass sheet mounted transversely spanning said air supporting means, and mounted so as to be movable relative to said air supporting means; vacuum means mounted on said positioning means, for engaging said vacuum means to a major side of said glass, said positioning means movable relative to said glass sheet.

12. In glass cutting apparatus, the combination comprising means for intermittently air supporting a glass sheet; means for scoring, including a scoring device, arranged to score a glass sheet positioned thereunder; means for positioning said glass sheet on said air supporting means in a substantially horizontal position; said positioning means mounted so as to be movable relative to said support means, and arranged to engage a major surface of said glass sheet supported on said support means, and to move the sheet relative to said support means; means for moving said positioning means and thereby moving said engaged glass sheet relative to said scoring means and stopping said positioning device at a preselected position with said glass sheet beneath said scoring means; said means for scoring arranged to move relative to said positioning means to score said glass sheet beneath said scoring means; electronic pulse counting means carried by said positioning means for measuring the distance traveled by said positioning means, so that said positioning means may be positioned relative to said scoring means at preselected position beneath said scoring means to cut said glass sheet into selected sizes.

References Cited by the Examiner

UNITED STATES PATENTS

| | | | |
|---|---|---|---|
| 1,930,582 | 10/1933 | Burdett et al. | 225—96.5 |
| 2,747,280 | 5/1956 | Motoharu Kurata | 83—10 X |
| 2,945,600 | 7/1960 | Thumin | 214—1 |
| 2,948,991 | 8/1960 | Walters et al. | 225—96.5 |
| 3,027,646 | 4/1962 | Brichard et al. | 225—96.5 |
| 3,052,339 | 9/1962 | Carter | 83—402 X |
| 3,141,589 | 7/1964 | Jochim | 225—2 |
| 3,151,794 | 10/1964 | Brand | 225—96.5 |

WILLIAM W. DYER, JR., *Primary Examiner.*

J. M. MEISTER, *Assistant Examiner.*